(12) United States Patent
Kang et al.

(10) Patent No.: US 7,760,255 B2
(45) Date of Patent: Jul. 20, 2010

(54) METHOD AND APPARATUS FOR INTERPOLATION OF INTERLACED CMYG COLOR FORMAT

(75) Inventors: Moon-gi Kang, Goyung-si (KR); Young-seok Han, Seoul (KR); Min-kyu Park, Seoul (KR); Chang-won Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1050 days.

(21) Appl. No.: 11/448,780

(22) Filed: Jun. 8, 2006

(65) Prior Publication Data

US 2006/0284989 A1    Dec. 21, 2006

(30) Foreign Application Priority Data

Jun. 8, 2005    (KR) .................. 10-2005-0048842

(51) Int. Cl.
*H04N 3/14*    (2006.01)
*H04N 5/335*    (2006.01)
*H04N 9/04*    (2006.01)
*G06K 9/40*    (2006.01)
*G06K 9/32*    (2006.01)

(52) U.S. Cl. .................. 348/272; 382/300; 382/266
(58) Field of Classification Search .............. 382/266, 382/162–167; 348/222.1, 272–283
See application file for complete search history.

(56) References Cited

U.S. PATENT DOCUMENTS

| | | | |
|---|---|---|---|
| 6,766,068 B2 * | 7/2004 | Aoyama et al. ............ | 382/300 |
| 6,900,836 B2 * | 5/2005 | Hamilton, Jr. ............ | 348/241 |
| 7,333,678 B1 * | 2/2008 | Huang et al. ............ | 382/300 |
| 7,391,920 B2 * | 6/2008 | Abe ............ | 382/266 |
| 7,423,691 B2 * | 9/2008 | Orlick et al. ............ | 348/448 |
| 7,444,037 B2 * | 10/2008 | Kita ............ | 382/300 |
| 7,460,734 B2 * | 12/2008 | Chao ............ | 382/300 |
| 7,502,505 B2 * | 3/2009 | Malvar et al. ............ | 382/162 |
| 2008/0123998 A1 * | 5/2008 | Gomi et al. ............ | 382/300 |

FOREIGN PATENT DOCUMENTS

JP    2001-258040 A    9/2001

* cited by examiner

*Primary Examiner*—Jason Chan
*Assistant Examiner*—Pritham Prabhakher
(74) *Attorney, Agent, or Firm*—Sughrue Mion, PLLC (57) ABSTRACT

A color interpolation apparatus includes: an area determination unit determining an area between a flat area and an edge area, to which a sampling unit formed with two pixels of the photoelectric device, vertically adjacent to each other, and to be interpolated belongs; a linear interpolation unit performing linear interpolation of the sampling unit determined to belong to a flat area and outputting a luminance signal or a chrominance signal; a weight value calculation unit calculating the weight value of an adjacent sampling unit to be used for weight interpolation of the sampling unit determined to belong to an edge area; and a weight interpolation unit performing weight interpolation of the sampling unit determined to belong to an edge area, by using the weight and outputting a luminance signal or a chrominance signal.

31 Claims, 7 Drawing Sheets

EDGE AREA

FLAT AREA

FIG. 5B

EDGE AREA

FIG. 6A

FLAT AREA

FIG. 6B

EDGE AREA

FIG. 7

EDGE AREA

FIG. 8A

EDGE AREA

FIG. 8B

EDGE AREA

FIG. 8C

EDGE AREA

FIG. 8D

EDGE AREA

METHOD AND APPARATUS FOR INTERPOLATION OF INTERLACED CMYG COLOR FORMAT

CROSS-REFERENCE TO RELATED PATENT APPLICATION

This application claims priority from Korean Patent Application No. 10-2005-0048842, filed on Jun. 8, 2005 in the Korean Intellectual Property Office, the entire content of which is incorporated herein by reference.

BACKGROUND OF THE INVENTION

1. Field of the Invention

Apparatuses and methods consistent with the present invention relate to color interpolation, and more particularly, to interpolation using an interlaced Cyan, Magenta, Yellow, Green (CMYG) color format.

2. Description of the Related Art

Generally, a digital camera or camcorder uses a charge coupled device (CCD) or a complementary metal-oxide semiconductor (CMOS) instead of film. In the CCD, millions of light receiving elements are densely disposed and each light receiving element corresponds to one pixel and detects the luminance of an image being input. Since through the CCD only the luminance of light is detected, an image output from the CCD is not a color image recognized by a person but a black-and-white image. Accordingly, in order to obtain a color image from the image output of the CCD, a color filter is put on each pixel, a color value with respect to a predetermined color format is obtained, and a color image is obtained.

The color filters can be classified into primary color filters using Red, Green, Blue (RGB) color filters, including red, green, and blue, and complementary color filters using CMYG color filters, including cyan, magenta, yellow, and green. Since the CMYG color format has a better sensitivity of colors than that of the RGB color format, the CMYG color format is widely used as the color format of a camcorder.

Meanwhile, when one CCD device is used for one pixel, one pixel can store the color information of only one channel in color information of a plurality of channels. Though there are methods using a plurality of CCD devices for one pixel and storing color information of a plurality of channel complying with the RGB or CMYG color format, the CCD is an expensive device and therefore in many cases one CCD device is used for one pixel. When one CCD device is used for one pixel, in order to obtain information on a complete color image, color information of other channels not stored in pixels should be estimated (interpolated) from information on adjacent pixels.

Figure 1:
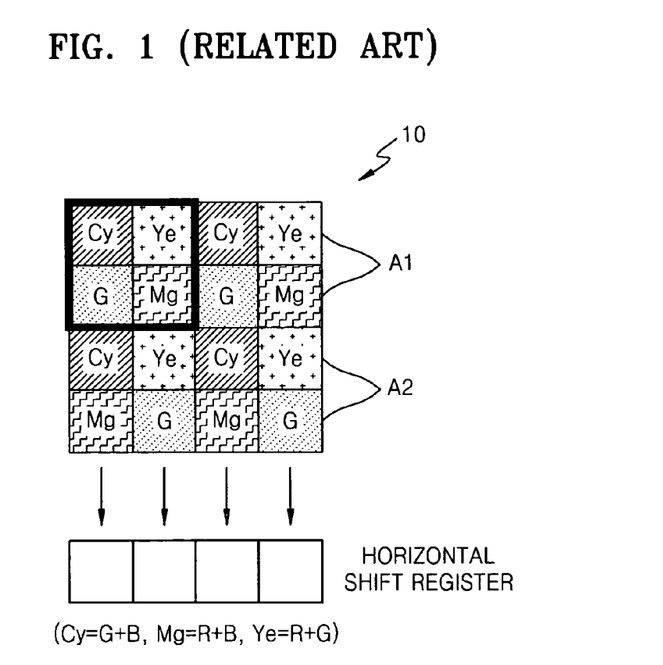
FIG. 1 is a diagram briefly explaining a related art color interpolation process in a CMYG color format.

FIG. 1 is a diagram briefly explaining a related art color interpolation process in a CMYG color format.

Referring to FIG. 1, in each pixel of a CCD 10, color information of cyan (hereinafter referred to as "Cy"), yellow (hereinafter referred to as "Ye"), magenta (hereinafter referred to as "Mg"), and green (hereinafter referred to as "G"), is stored, and an interlaced signal obtained by adding top pixels and bottom pixels is output as a final output. For example, in case of A1, (G+CY) and (Mg+Ye) are output as color values, and in case of A2, (Mg+Cy) and (G+Ye) are output as color values.

By calculating the (G+CY), (Mg+Ye), (Mg+Cy) and (G+Ye), the luminance (Y) and chrominance (R−Y, B−Y) can be obtained.

From the color information input in the top 2 rows (A1) of the CCD 10, Y and (R−Y) can be calculated as the following equations 1 and 2:

$$Y = \{(G + Cy) + (Mg + Ye)\} \times \frac{1}{2} = \frac{1}{2}\{(2B + 3G + 2R)\} \quad (1)$$

$$R - Y = \{(Mg + Ye) - (G + Cy)\} = 2R - G \quad (2)$$

In the same manner, from the color information input in the bottom two rows (A2) of the CCD 10, Y and (B−Y) can be calculated as the following equations 3 and 4:

$$Y = \{(G + Ye) + (Mg + Cy)\} \times \frac{1}{2} = \frac{1}{2}\{(2B + 3G + 2R)\} \quad (3)$$

$$(B - Y) = \{(Mg + Cy)\} - (G + Ye) = 2B - G \quad (4)$$

If Y, (R−Y), and (B−Y) are obtained through the equations 1 through 4, a color in the RGB or YCbCr format appropriate to output can be restored from the luminance and chrominance components by using simple linear conversion. Here, the chrominance signals (R−Y, B−Y) are sampled in the vertical direction twice as fast as the luminance signal (Y). Accordingly, separately from the luminance signal (Y), the chrominance signals (R−Y, B−Y) should be interpolated in the vertical direction.

In the color interpolation method according to the conventional technology, a pixel to be interpolated is formed as the sum or difference of two pixels extracted from CCD raw data, and therefore the interpolated pixel has a phase difference of about ½ pixel from the original image. This ½ pixel phase difference can be a problem when the edge is thin. Accordingly, in order to prevent this ½-pixel phase difference, the phase of an input signal and the phase of an output signal need to be identical.

Furthermore, in the color interpolation method according to the conventional technology, assuming that each pixel has statistically similar characteristics, interpolation is performed by using the sum and difference of four pixels. Accordingly, a serious error can occur on the boundary.

When (Cy+G) and (Ye+Mg) are included in different areas, (B−Y) and (R−Y) are calculated by using the equations 2 and 4, have a problem in that many lines are generated on the boundary. This problem is evenly spread to each color channel of an output signal RGB or YCbCr in a linear conversion process, and causes color noise and degradation in resolution.

SUMMARY OF THE INVENTION

The present invention provides a color interpolation method and apparatus for interpolation of a signal in an interlaced CMYG color format, in which the position of a pixel extracted for color interpolation is readjusted to prevent occurrence of a phase difference, and by expanding an area where color interpolation is performed, areas having similar statistical characteristics are distinguished in order to obtain an image having an improved picture quality.

According to an aspect of the present invention, there is provided a color interpolation apparatus for interpolating a luminance signal and/or a chrominance signal from a CMYG color signal output from a photoelectric device, the color interpolation apparatus including: an area determination unit which determines an area between a flat area and an edge area, to which a sampling unit formed with two pixels of the photoelectric device, vertically adjacent to each other, and to be interpolated belongs; a linear interpolation unit that performs linear interpolation of the sampling unit determined to belong to the flat area in the area determination unit, and outputs a luminance signal and/or a chrominance signal; a weight value calculation unit that calculates a weight value of an adjacent sampling unit to be used for weight interpolation of the sampling unit that is determined to belong to the edge area in the area determination unit; and a weight interpolation unit that performs weight interpolation of the sampling unit determined to belong to the edge area, by using the weight value and outputs a luminance signal and/or a chrominance signal.

According to another aspect of the present invention, there is provided a color interpolation method of interpolating a luminance signal and/or a chrominance signal from a CMYG color signal output from a photoelectric device, the color interpolation method including: determining an area between a flat area and an edge area, to which a sampling unit formed with two pixels of the photoelectric device, vertically adjacent to each other, and to be interpolated belongs; performing linear interpolation of the sampling unit that is determined to belong to the flat area, and outputting the luminance signal and/or the chrominance signal; calculating a weight value of an adjacent sampling unit to be used for weight interpolation of the sampling unit determined to belong to an edge area; and performing weight interpolation of the sampling unit determined to belong to an edge area, by using the weight value and outputting the luminance signal and/or the chrominance signal.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 2:
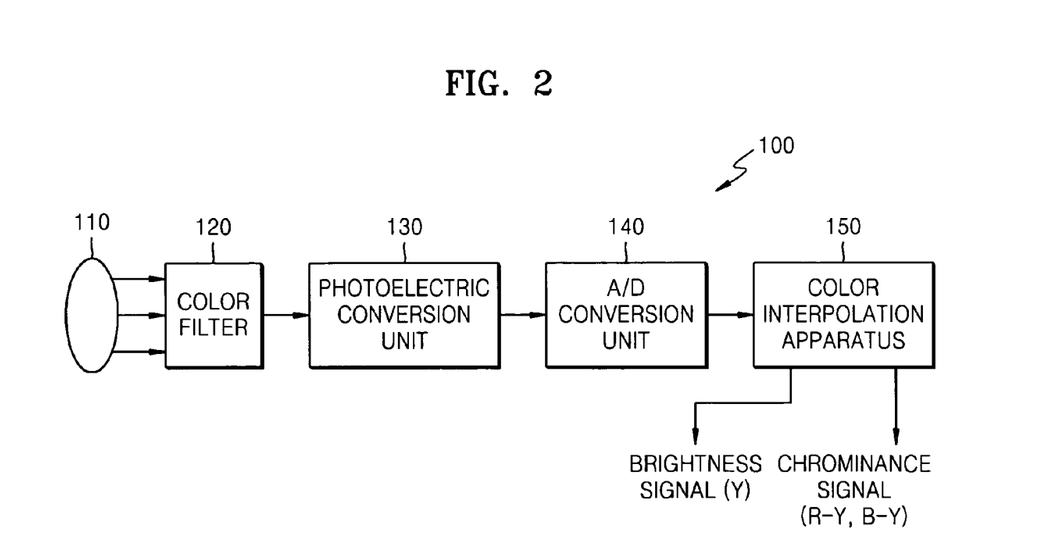
FIG. 2 is a block diagram briefly showing an image pickup apparatus using a color interpolation apparatus according to an exemplary embodiment of the present invention.

FIG. 2 is a block diagram briefly showing an image pickup apparatus using a color interpolation apparatus according to an exemplary embodiment of the present invention. Referring to FIG. 2, an image of an object input through a lens 110 is input to a photoelectric conversion unit 130 through a color filter 120. Here, as the photoelectric conversion unit 130, a CCD or complementary metal-oxide semiconductor (CMOS) can be used. As the color filter 120, a CMYG color filter formed with filters that transmit Cy, Mg, Ye, and G color components and are arranged in a check pattern is used. An analog-to-digital (A/D) conversion unit 140 converts an analog image signal output from the photoelectric conversion unit 130 into a digital signal, and a color interpolation apparatus 150 converts the digital signal into a luminance signal (Y) and a chrominance signal (R−B, B−Y).

Figure 3:
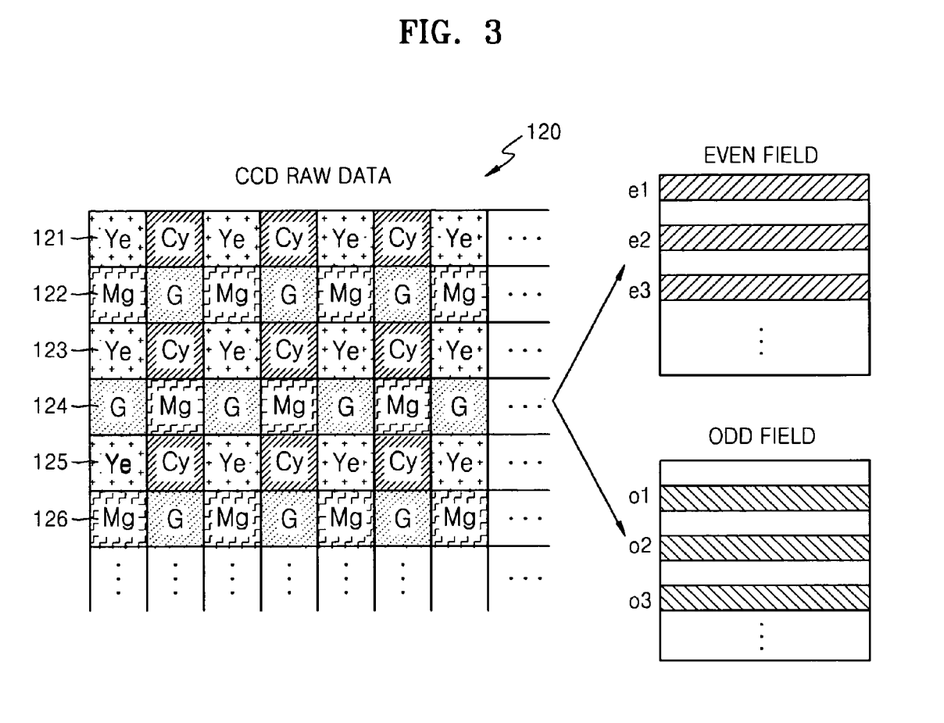
FIG. 3 illustrates an example of the structure of a color filter of FIG. 4.
Figure 4:
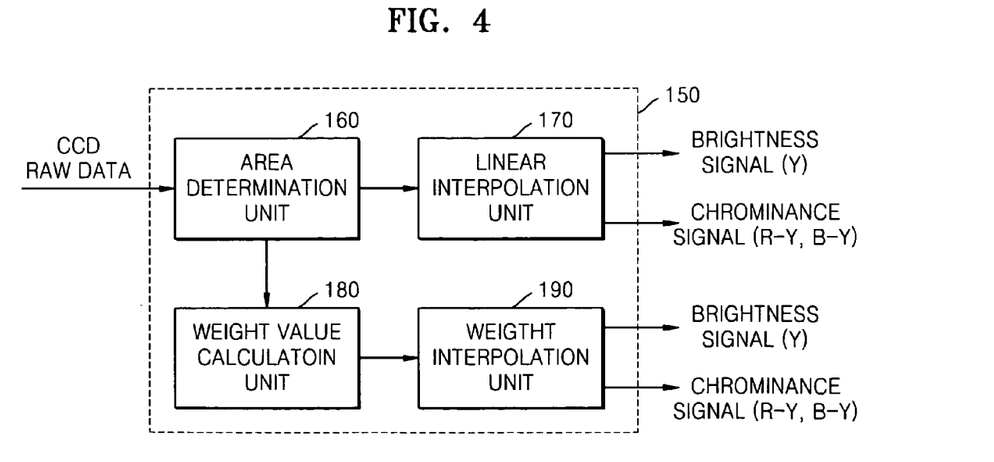
FIG. 4 is a block diagram of the structure of a color interpolation apparatus according to an exemplary embodiment of the present invention.

FIG. 3 illustrates an example of the structure of the color filter 120 of FIG. 4.

In FIG. 3, "Cy" is a filter transmitting a cyan component, "Mg" is a filter transmitting a magenta component, "Ye" is a filter transmitting a yellow component, and "G" is a filter transmitting a green component. This CMYG color filter is widely used in interlaced scan type color video camera systems in which an odd field and an even field are paired to form a frame. According to the interlaced scan method, the signals output from two lines of the photoelectric conversion unit 130 are combined to form one line of an interlaced scan field. That is, the even field is constructed by adding the first line 121 and the second line 122 to form line e1, adding the third line 123 and the fourth line 124 to form line e2, and adding the fifth line 125 and the sixth line 126 to form line e3. In a similar manner, the odd field is constructed by adding the second line 122 and the third line 123 to form line o1, and the fourth line 124 and the fifth line 125 to form line o2. Accordingly, two pixels of the photoelectric conversion unit 130 vertically adjacent to each other correspond to one pixel of the interlaced scan field.

FIG. 4 is a block diagram of the structure of a color interpolation apparatus according to an exemplary embodiment of the present invention.

Referring to FIG. 4, the color interpolation apparatus 150, according to the an exemplary embodiment of present invention, includes an area determination unit 160, a linear interpolation unit 170, a weight calculation unit 180, and a weight interpolation unit 190.

The color interpolation apparatus 150, according to an exemplary embodiment of the present invention, interpolates a luminance signal and a chrominance signal in units of sampling units, each formed with two pixels of the photoelectric unit 130 vertically adjacent to each other, and outputs the interpolated signals. This is because the photoelectric conversion unit 130 outputs a color signal in units of the sampling units, each being the sum of two pixels vertically adjacent to each other.

The area determination unit 160 determines whether a sampling unit to be interpolated belongs to a flat area or an edge area.

Figure 5A:
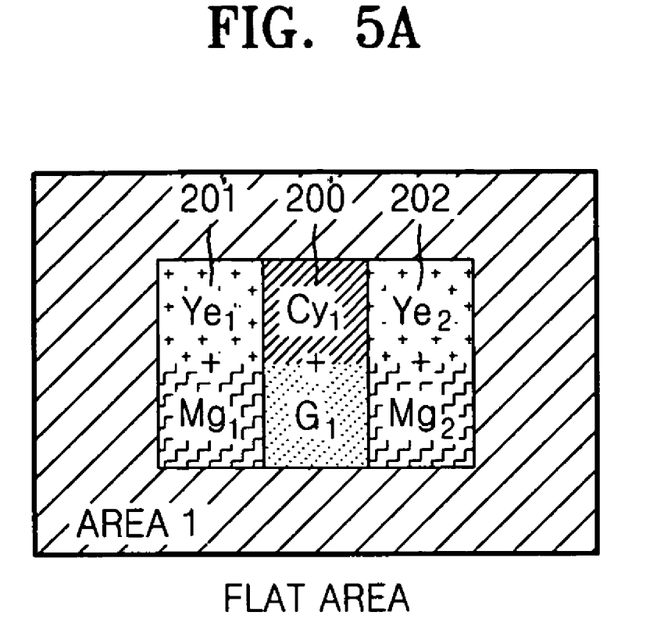
FIGS. 5A and 5B illustrate a process for determining an area to which a sampling unit to be interpolated belongs according to an exemplary embodiment of the present invention.
Figure 5B:
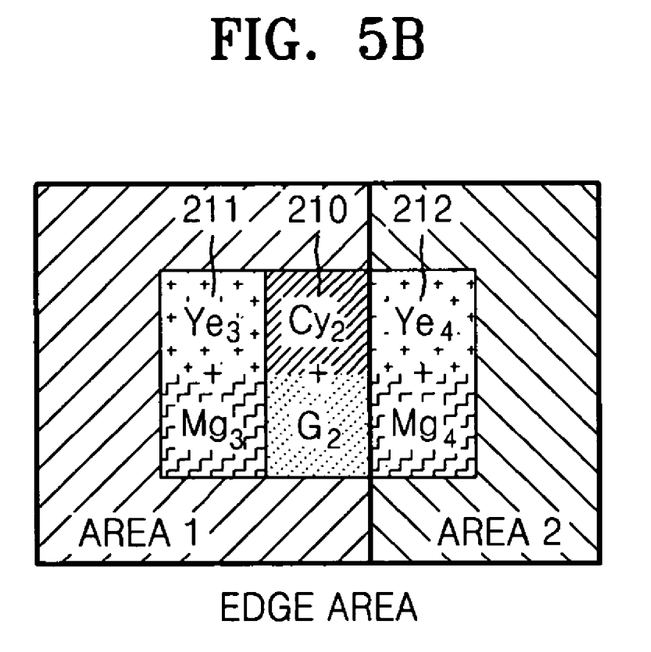

FIGS. 5A and 5B illustrate a process for determining an area to which a sampling unit to be interpolated in the area determination unit 160 of the color interpolation apparatus 150 belongs according to an exemplary embodiment of the present invention.

In order to determine whether a sampling unit to be currently interpolated belongs to an edge area or a flat area, the area determination unit 160 uses the absolute value of the difference between a sampling unit located in the left of the sampling unit to be currently interpolated and a sampling unit located in the right of the sampling unit to be currently interpolated.

Referring to FIG. 5A, the area determination unit 160 calculates $|(Ye_1+Mg_1)-(Ye_2+Mg_2)|$ that is the absolute value of the difference between the sum $(Ye_1+Mg_1)$ of two pixels included in the left sampling unit 201 and the sum $(Ye_2+Mg_2)$ of two pixels included in the right sampling unit 202. Then, if the absolute value of the difference is less than or equal to a predetermined threshold value, the area determination unit 160 determines that the sampling unit 200 to be currently interpolated is in a flat area, and if the absolute value of the difference is greater than the threshold value, the area determination unit 160 determines that the sampling unit 200 belongs to an edge area. In FIG. 5A, the absolute value of the difference is less than or equal to a predetermined threshold value, and the area determination unit 160 determines that the sampling unit 200 to be currently interpolated is in a flat area.

If the left-hand side sampling unit of the sampling unit 210 to be interpolated and the right-hand side sampling unit 212 of the sampling unit 210 belong to different areas as shown in FIG. 5B, $|(Ye_3+Mg_3)-(Ye_4+Mg_4)|$ that is the absolute value of the difference between the sum $(Ye_3+Mg_3)$ of two pixels included in the left sampling unit 211 and the sum $(Ye_4+Mg_4)$ of two pixels included in the right sampling unit 212 is greater than a predetermined value, and therefore the area determination unit 160 can determine that the sampling unit 210 to be interpolated is in an edge area.

The linear interpolation unit 170 performs linear interpolation for a sampling unit that is determined by the area determination unit 160 to be in a flat area.

In particular, the linear interpolation unit 170, according to an exemplary embodiment of the present invention, uses at least six pixels, that is, at least three sampling units, for an interpolation process such that the problem of the phase difference that can occur when the conventional color interpolation using four pixels is performed can be solved.

Figure 6A:
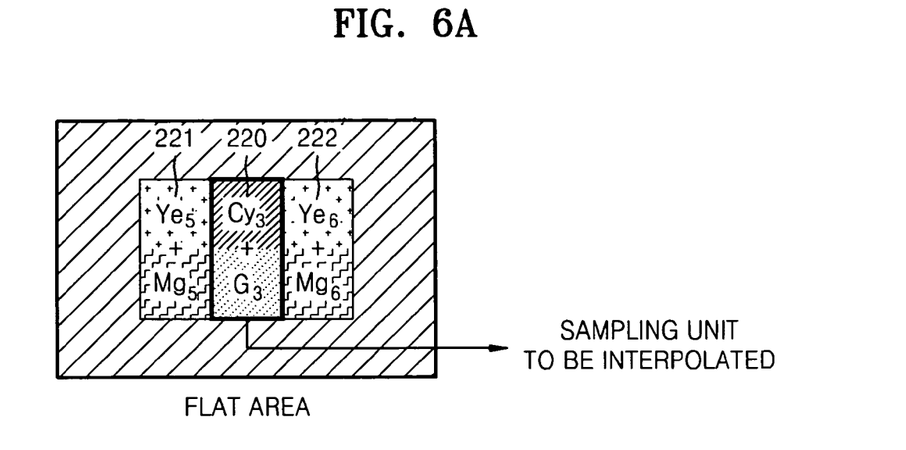
FIGS. 6A and 6B illustrate a process for performing linear interpolation according to an exemplary embodiment of the present invention.
Figure 6B:
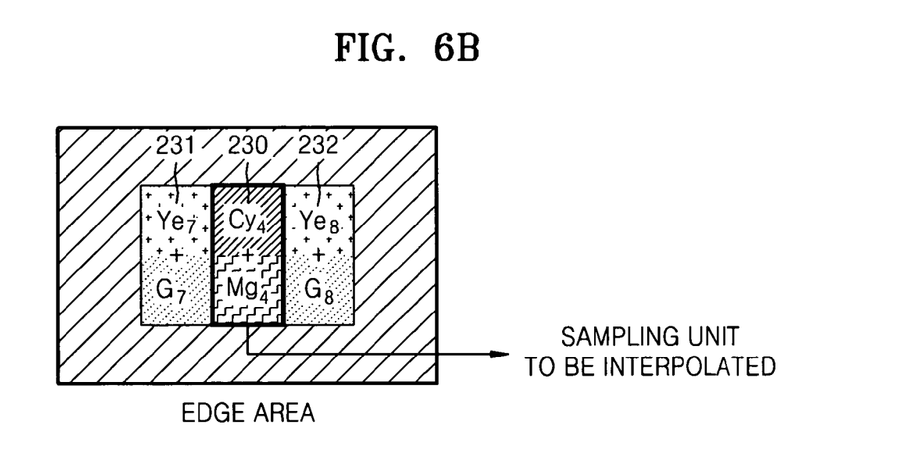

FIGS. 6A and 6B illustrate a process for performing linear interpolation in a linear interpolation unit 170 of the color interpolation apparatus 150 according to an exemplary embodiment of the present invention. Here, FIG. 6A shows a case where linear interpolation is performed by using (Ye+Mg) and (Cy+G) sampling units output from the photoelectric conversion unit 130, and FIG. 6B shows a case where linear interpolation is performed by using (Ye+G) and (Cy+Mg) sampling units.

In order to interpolate a luminance signal and a chrominance signal corresponding to a sampling unit to be currently interpolated, the linear interpolation unit 170 uses the mean value of the sum of pixels included in the sampling unit immediately to the left of the sampling unit to be interpolated, and the sampling unit immediately to the right of the sampling unit to be interpolated, and outputs the luminance signal and the chrominance signal.

More specifically, referring to FIG. 6A, the linear interpolation unit 170 adds the mean values of the sampling unit 221 to the left of the sampling unit 220 and the sampling unit 222 to the right of the sampling unit 220, the sampling unit 220 to be currently interpolated, and outputs the luminance signal Y that corresponds to the sampling unit 220 to be interpolated and is $(Cy_3+G_3)+\{(Ye_5+Mg_5)+(Ye_6+Mg_6)\}/2$. Also, the linear interpolation unit 170 subtracts the mean values of the sampling unit 221 to the left of the sampling unit 220 and the sampling unit 222 to the right of the sampling unit 220, from the sampling unit 220, and calculates and outputs the chrominance signal (R−Y) that is $(Cy_3+G_3)-\{(Ye_5+Mg_5)+(Ye_6+Mg_6)\}/2$.

In a similar manner, in case of FIG. 6B, in order to get the luminance signal Y and the chrominance signal (B−Y) corresponding to the sampling unit 230 to be currently interpolated, the linear interpolation unit 170 calculates and outputs the luminance signal Y that is $(Cy_4+Mg_4)+\{(Ye_7+G_7)+(Ye_8+G_8)\}/2$, and the chrominance signal (B−Y) that is $(Cy_4+Mg_4)-\{(Ye_7+G_7)+(Ye_8+G_8)\}/2$.

Meanwhile, the sampling unit that is determined to be in an edge area by the area determination unit 160 is interpolated by a weight value. The weight value calculation unit 180 calculates the weight values of adjacent sampling units used to interpolate the sampling unit to be interpolated, by using spatial correlations between the sampling unit to be interpolated and the adjacent sampling units. Here, the spatial correlation can be calculated by obtaining the difference or variance of the sampling units.

Figure 7:
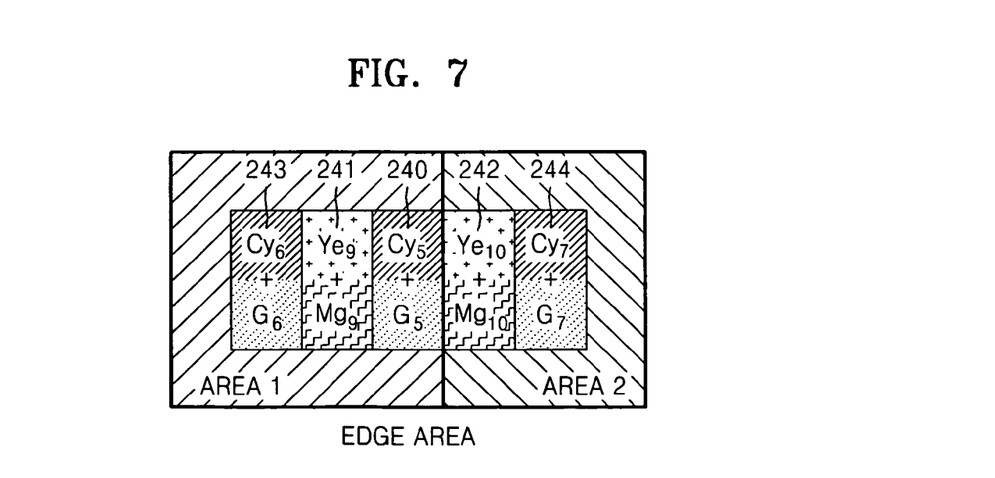
FIG. 7 illustrates an example of calculating a weight value based on the difference of sampling units adjacent to a sampling unit to be interpolated according to an exemplary embodiment of the present invention.

FIG. 7 illustrates an example of calculating a weight value based on the difference of sampling units adjacent to a sampling unit to be interpolated in the weight value calculation unit 180 of the color interpolation unit according to an exemplary embodiment of the present invention.

As described above, in order to interpolate the sampling unit 240 to be currently interpolated, the color interpolation apparatus uses the sampling unit 241 adjacent to and to the left of the sampling unit 240 to be currently interpolated, and the sampling unit 242 adjacent to and to the right of the sampling unit 240. At this time, in order to color interpolate the sampling unit 240 that is on an edge area, the adjacent sampling units 241 and 242 are given respective weight values considering the spatial correlation and by using the weight values weight interpolation is performed in the weight interpolation unit 190.

Referring to FIG. 7, the differences between the sampling unit 240 to be currently interpolated and the adjacent sampling units 243 and 244 are calculated. For example, the difference (diff1), $diff1=|(Cy_5+G_5)-(Cy_6+G_6)|$, which is the difference with a sampling unit 243 that has the same color signal as that of the sampling unit 240 to be interpolated and is closest to the sampling unit 240 among sampling units positioned to the left of the sampling unit 240, is calculated. Also, the difference (diff2), $diff2=|(Cy_5+G_5)-(Cy_7+G_7)|$, which is the difference with a sampling unit 244 that has the same color signal as that of the sampling unit 240 to be interpolated and is closest to the sampling unit 240 among sampling units positioned to the right of the sampling unit 240, is calculated.

Based on the differences (diff1, diff2), the weight value (W1) of the left sampling unit 241 is calculated as $$W1 = \frac{1}{(diff1)^n + 1}$$

and the weight value (W2) of the right sampling unit 242 is calculated as $$W2 = \frac{1}{(diff2)^n + 1}.$$

A relatively bigger weight value is given to the left sampling unit 241 belonging to an identical area (Area 1) to which the sampling unit 240 to be interpolated belongs, and a relatively smaller weight value is given to the right sampling unit 242 belonging to an area (Area 2) different from the area to which the sampling unit 240 belongs. Accordingly, when weight interpolation is performed considering the relative weights, a sampling unit belonging to an identical area to which a sampling unit to be interpolated belongs has a relatively greater influence on the luminance signal and the chrominance signal such that the edge area becomes clear and the interpolation is performed without color noise.

Figure 8A:
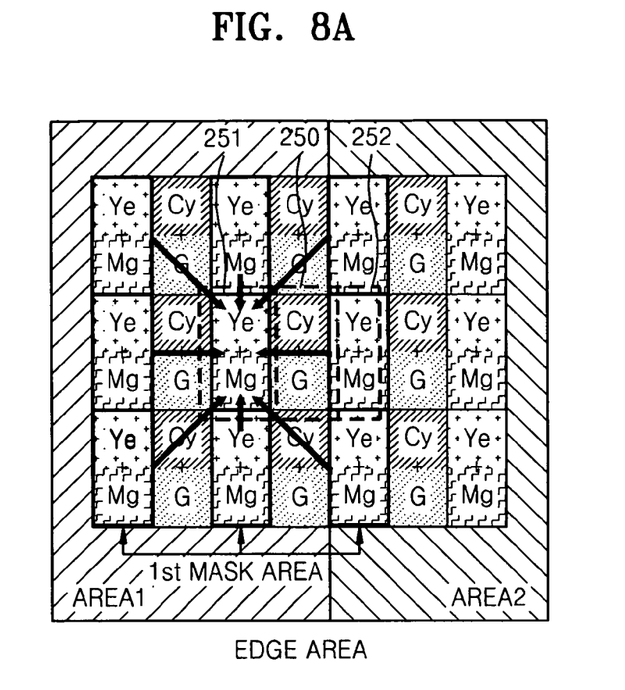
FIGS. 8A, 8B, 8C and 8D illustrate an example of calculating a weight value based on the variance among sampling units included in a predetermined mask area according to an exemplary embodiment of the present invention.
Figure 8B:
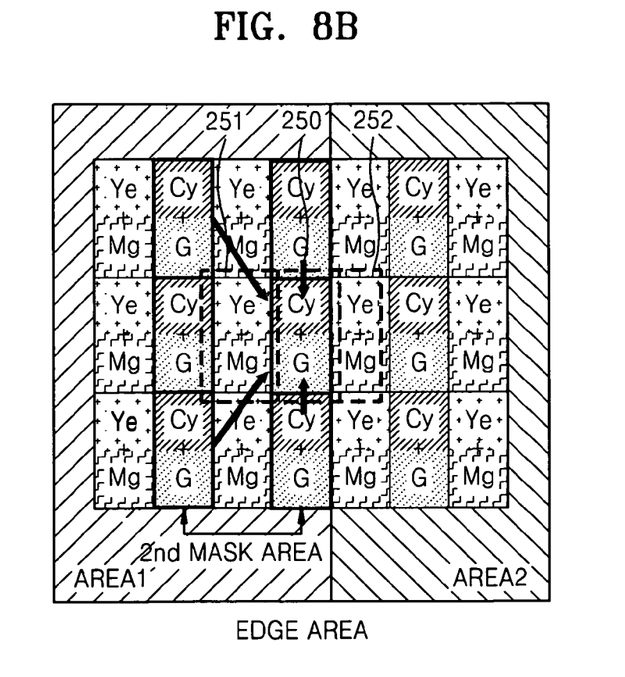

FIGS. 8A, 8B, 8C and 8D illustrate an example of calculating a weight value based on the variance among sampling units included in a predetermined mask area in the weight value calculation unit 180 of the color interpolation apparatus according to an exemplary embodiment of the present invention. In FIGS. 8A and 8B, it is assumed that reference number 250 indicates a sampling unit to be currently interpolated, and reference numbers 251, and 252 indicate a left sampling unit and a right sampling unit, respectively, to be used for color interpolation of the sampling unit 250 to be interpolated.

Generally, if the variance from a predetermined pixel is big, it is determined that the predetermined pixel is included in an edge are, and if the variance is small, it is determined that the predetermined pixel is in a flat area. That is, the area including an edge area has a bigger variance. Accordingly, in order to determine the sampling unit 250 to be currently interpolated and the adjacent sampling units 251 and 252 are in an identical area, the weight value calculation unit 180 calculates a variance and gives a weight inversely proportional to the variance, to the adjacent sampling unit.

Referring to FIGS. 8A and 8B, in order to give the weight value (W1) of the left sampling unit 251, a first variance value (var1) among sampling units in a first mask area centered at the left sampling unit 251 is calculated and a second variance value (var2) among sampling units in a second mask area centered at the left sampling unit 251 is calculated, and then the weight value (W1) is given such that the weight value (W1) is inversely proportional to the value obtained by adding the first variance value (var1) and the second variance value (var2).

Here, the first mask area is an area including sampling units that are the same type as that of the left sampling unit 251 and are positioned nearest to the left sampling unit 251 in the vertical, horizontal, and diagonal directions. Also, the second mask area is an area including sampling units that are the same type as that of the sampling unit 250 to be interpolated and are positioned centered at the left sampling unit 251.

From the sum of the variances obtained in the first and second mask areas, the weight value calculation unit 180 gives the weight value (W1) that is $$W1 = \frac{1}{(\text{var}1 + \text{var}2)^n + 1}$$

(n is an arbitrary, but predetermined degree), to the left sampling unit 251.

Figure 8C:
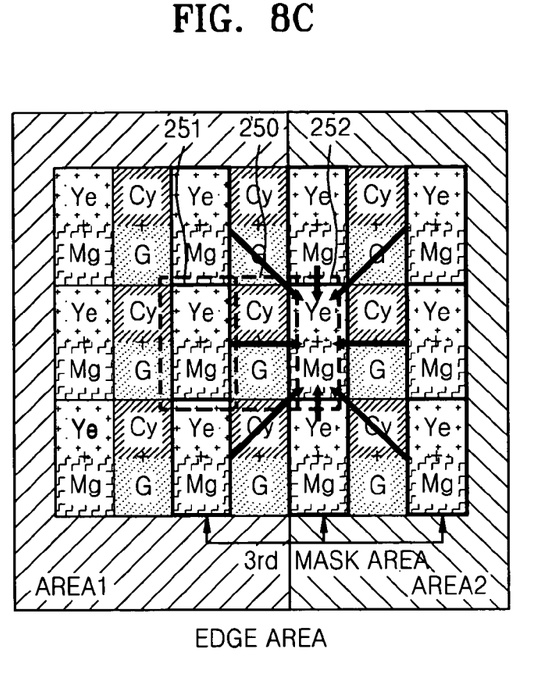
Figure 8D:
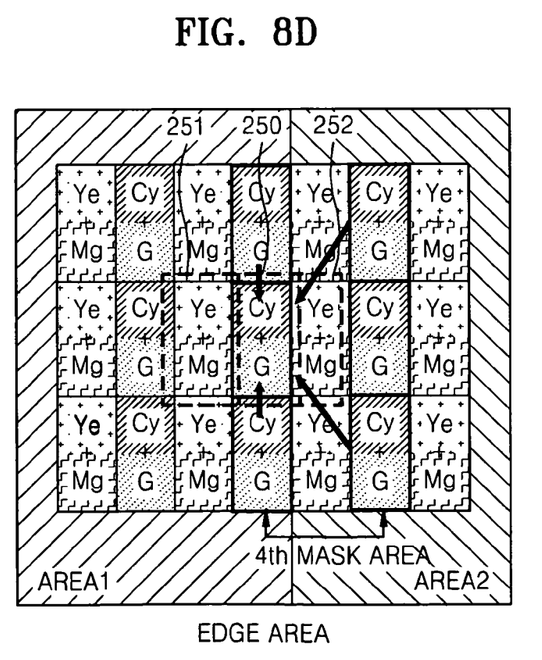

Likewise, referring to FIGS. 8C and 8D, in order to give the weight value (W2) of the right sampling unit 252, a third variance value (var3) among sampling units in a third mask area centered at the right sampling unit 252 is calculated and a fourth variance value (var4) among sampling units in a fourth mask area centered at the right sampling unit 252 is calculated, and then the weight value (W2) is given such that the weight value (W2) is inversely proportional to the value obtained by adding the third variance value (var3) and the fourth variance value (var4).

Here, the third mask area is an area including sampling units that are the same type as that of the right sampling unit 252 and are positioned nearest to the right sampling unit 252 in the vertical, horizontal, and diagonal directions. Also, the fourth mask area is an area including sampling units that are the same type as that of the sampling unit 250 to be interpolated and are positioned centered at the right sampling unit 252.

From the sum of the variances obtained in the third and fourth mask areas, the weight value calculation unit 180 gives the weight value (W2) that is $$W2 = \frac{1}{(\text{var}3 + \text{var}4)^n + 1}$$

(n is an arbitrary, but predetermined degree), to the right sampling unit 252.

Figure 9:
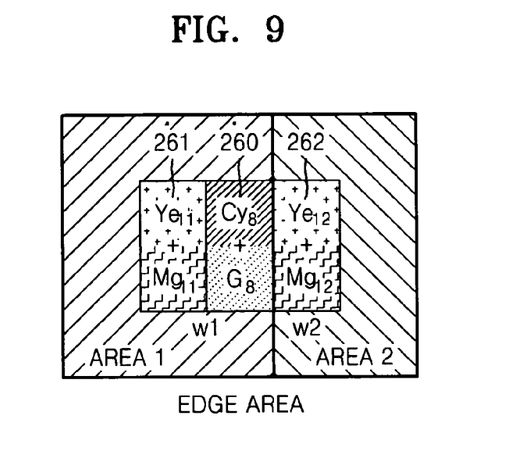
FIG. 9 illustrates a weight interpolation process according to an exemplary embodiment of the present invention.

FIG. 9 illustrates a weight interpolation process performed in the weight interpolation unit 190 of the color interpolation apparatus 150 according to an exemplary embodiment of the present invention. In FIG. 9, reference number 260 indicates a sampling unit that is in an edge area and is to be interpolated, and reference numbers 261 and 262 indicate a left sampling unit and a right sampling unit, respectively, to be used for color interpolation of the sampling unit 260 to be interpolated. Also, it is assumed that the left and right sampling units 261 and 262 have weight value W1 and weight value W2, respectively.

Assuming that d denotes the sum of pixels included in the sampling unit 260 to be interpolated, e denotes the sum of pixels included in the sampling unit 261 to the left of the sampling unit 260 to be interpolated, f denotes the sum of pixels included in the sampling unit 262 to the right of the sampling unit 260, W1 denotes the weight value of the left sampling unit 261, and W2 denotes the weight value of the right sampling unit 262, the weight interpolation unit 190 outputs a luminance signal that is d+{(e×w1)+(f×w2)}/(W1+W2) and a chrominance signal that is d−{(e×w1)+(f×w2)}/(W1+W2). For example, in order to interpolate the luminance signal and chrominance signal of the sampling unit 260 that is in the edge area and to be interpolated, the weight interpolation unit 190 calculates the luminance signal (Y) as the following equation 5, by using the left and right sampling units 261 and 262, and the weights W1 and W2, and outputs the luminance signal (Y):

$$Y = (Cy_8 + G_8) + \{W1 \times (Ye_{11} + Mg_{11}) + W2 \times (Ye_{12} + Mg_{12})\} \quad (5)$$

Also, the weight interpolation unit 190 calculates the chrominance signal (R−Y) as the following equation 6 and outputs the chrominance signal (R−Y):

$$R-Y = (Cy_8 + G_8) - \{W1 \times (Ye_{11} + Mg_{11}) + W2 \times (Ye_{12} + Mg_{12})\} \quad (6)$$

Likewise, when weight interpolation is performed by using sampling units (Ye+G) and (Cy+Mg) as shown in FIG. 6B, the weight interpolation as described above can be performed so that the luminance signal (Y) and the chrominance (B−Y) can be calculated.

Figure 10:
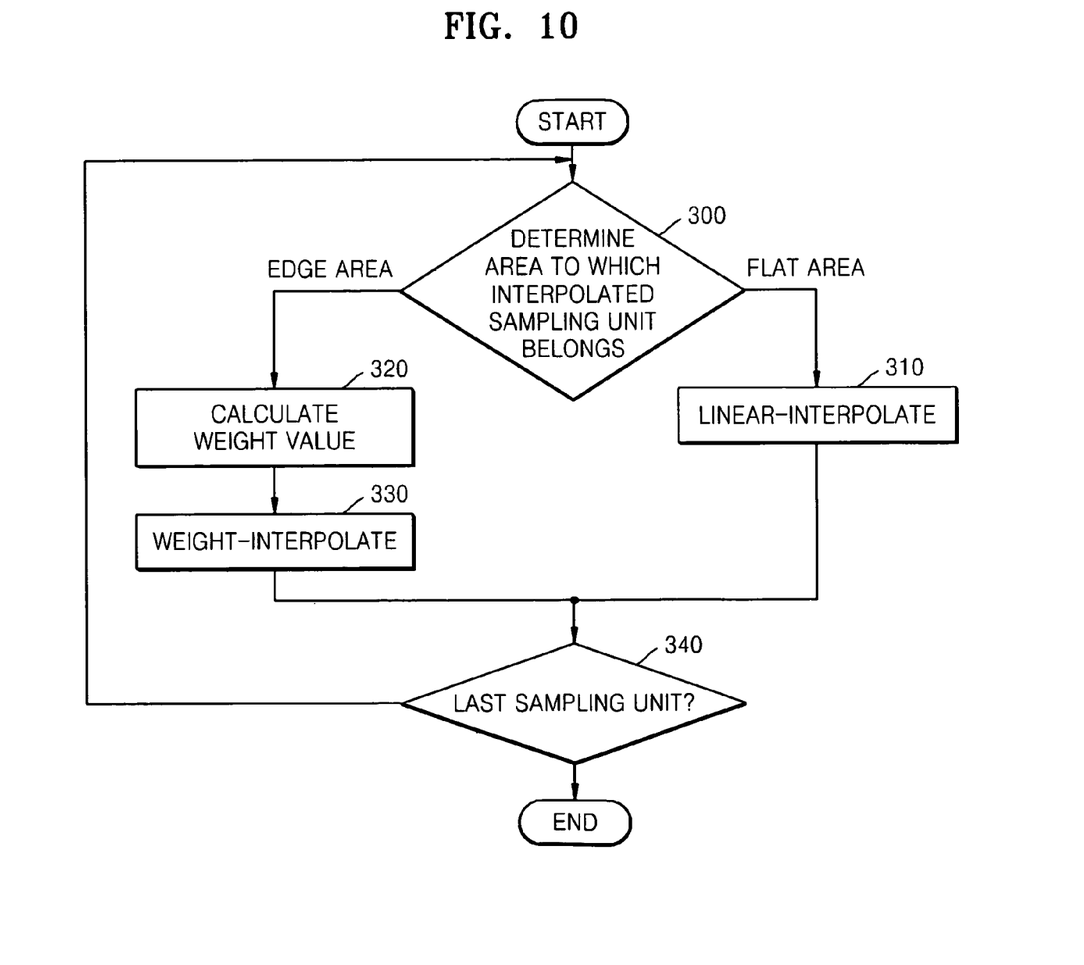
FIG. 10 is a flowchart of a color interpolation method according to an exemplary embodiment of the present invention.

FIG. 10 is a flowchart of a color interpolation method according to an exemplary embodiment of the present invention.

First, it is determined whether a sampling unit to be currently performed is in an edge area or a flat area in operation 300. For example, the absolute value of the difference of a sampling unit to the left of the sampling unit to be currently interpolated and a sampling unit to the right of the sampling unit to be currently interpolated can be used. As described above, if the absolute value of the difference is equal to or less than a predetermined threshold, it is determined that the sampling unit to be currently interpolated is in a flat area, and if the absolute value is greater than the predetermined threshold, it is determined that the sampling unit to be currently interpolated is in an edge area.

According to the result of the determination, linear interpolation is performed for the sampling unit in the flat area in operation 310. In order to interpolate the luminance signal and the chrominance signal corresponding to the sampling unit to be currently interpolated, the luminance signal and the chrominance signal are output by using the mean of the sums of the pixels included in the sampling unit to the left of the sampling unit to be interpolated and the sampling unit to the right of the sampling unit to be interpolated.

For the sampling unit determined to be in the edge area, interpolation with weight values is performed. At this time, by using the spatial correlations of the sampling unit, which is to be interpolated and in the edge area, and adjacent sampling units, the weight values of the adjacent sampling units used for the interpolation of the sampling unit to be interpolated are calculated in operation 320.

As described above, the spatial correlations can be calculated by using the difference or variance of the pixel values of the sampling units.

Next, by using the weights, weight interpolation is performed in operation 330, and the operations 300 through 330 are repeated until the color interpolation of all sampling units forming one frame is completed in operation 340.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

According to an exemplary embodiment of the present invention, color noise that can occur in an edge area when color interpolation is performed from a luminance signal or a chrominance signal of a photoelectric conversion device complying with the CMYG color format can be removed, and by expanding an area in which color interpolation is performed and distinguishing areas having similar statistical characteristics, an image with an improved picture quality can be obtained.

What is claimed is:

1. A color interpolation apparatus for interpolating a luminance signal or a chrominance signal from a Cyan, Magenta, Yellow, Green (CMYG) color signal output from a photoelectric device, the color interpolation apparatus comprising:

an area determination unit which determines an area between a flat area and an edge area, to which a sampling unit formed with two pixels of the photoelectric device, vertically adjacent to each other, and to be interpolated belongs;

a linear interpolation unit which performs linear interpolation of the sampling unit that is determined to belong to the flat area in the area determination unit, and outputs the luminance signal or the chrominance signal;

a weight value calculation unit which provides the weight value of an adjacent sampling unit to be used for weight interpolation of the sampling unit that is determined to belong to an edge area in the area determination unit; and a weight interpolation unit which performs weight interpolation of the sampling unit determined to belong to an edge area, based on the weight and outputs the luminance signal or the chrominance signal.

2. The apparatus of claim 1, wherein the area determination unit determines the area to which the data unit to be interpolated belongs, by using a difference of a sampling unit immediately to the left of the sampling unit to be interpolated and a sampling unit immediately to the right of the sampling unit to be interpolated.

3. The apparatus of claim 2, wherein the area determination unit calculates an absolute value of a difference between a sum of two pixels included in the sampling unit to the left of the sampling unit to be interpolated and a sum of two pixels included in the sampling unit to the right of the sampling unit to be interpolated, and if the absolute value of the difference is greater than a predetermined threshold, determines that the sampling unit to be interpolated belongs to the edge area, and if the absolute value of the difference is equal to or less than the predetermined area, determines that the sampling unit to be interpolated belongs to the flat area.

4. The apparatus of claim 1, wherein the linear interpolation unit outputs the luminance signal or a chrominance signal by using a sum of pixels included in the sampling unit in the flat area and to be interpolated, and a mean of sums of pixels included in sampling units adjacent to the sampling unit to be interpolated.

5. The apparatus of claim 4, wherein the linear interpolation unit calculates the luminance signal to be equal to $a+(b+c)/2$, a denotes the sum of pixels included in the sampling unit to be interpolated, b denotes a sum of pixels included in the sampling unit to the left of the sampling unit to be interpolated, and c denotes a sum of pixels included in a sampling unit to the right of the sampling unit to be interpolated.

6. The apparatus of claim 4, wherein the linear interpolation unit calculates the chrominance signal to be equal to $a-(b+c)/2$ a denotes the sum of pixels included in the sampling unit to be interpolated, b denotes a sum of pixels included in a sampling unit to the left of the sampling unit to be interpolated, and c denotes a sum of pixels included in a sampling unit to the right of the sampling unit to be interpolated.

7. The apparatus of claim 1, wherein the weight value calculation unit provides the weight value of the adjacent sampling unit to be used for interpolation of the sampling unit to be interpolated by using spatial correlations of the sampling unit that is in the edge area and to be interpolated, with sampling units adjacent to the sampling unit.

8. The apparatus of claim 7, wherein the weight value calculation unit calculates the weight value of the adjacent sampling unit so that the weight value is inversely proportional to a difference between the sampling unit to be interpolated and each of the adjacent sampling units in the horizontal direction.

9. The apparatus of claim 8, wherein the weight value calculation unit provides the weight value (W) as $$W = \frac{1}{|k-m|^n + 1},$$

k denotes a sum of pixels included in the sampling unit to be interpolated and m denotes the sum of pixels included in a sampling unit that is of a type identical to that of the sampling unit to be interpolated and is positioned on a same horizontal line on which the sampling unit to be interpolated is positioned and n denotes a predetermined degree.

10. The apparatus of claim 7, wherein the weight value calculation unit provides the weight value by using a variance of sampling units included in a predetermined mask area.

11. The apparatus of claim 10, wherein the weight value calculation unit provides a first variance among sampling units in a first mask area centered at the adjacent sampling unit, and a second variance among sampling units in a second mask area, and provides a weight value of the adjacent sampling unit so that the weight value is inversely proportional to a value obtained by adding the first and second variances.

12. The apparatus of claim 11, wherein the first mask area includes sampling units that are of a type identical to that of the adjacent sampling unit and are positioned in vertical, horizontal, and diagonal directions centered at the adjacent sampling unit.

13. The apparatus of claim 11, wherein the second mask area includes sampling units that are of a type identical to that of the sampling unit to be interpolated and are positioned centered at the adjacent sampling unit.

14. The apparatus of claim 11, wherein the weight interpolation unit interpolates the luminance signal or the chrominance signal through the weight calculation using the sampling unit to be interpolated, the weight value determined in the weight value calculation unit, and the adjacent sampling unit, and outputs the luminance signal or the chrominance signal.

15. The apparatus of claim 14, wherein the weight interpolation unit calculates the luminance signal to be d+{(e×w1)+(f×w2)}/(W1+W2), d denotes a sum of pixels included in the sampling unit to be interpolated, e denotes the sum of pixels included in a sampling unit to the left of the sampling unit to be interpolated, f denotes the sum of pixels included in a sampling unit to the right of the sampling unit, W1 denotes a weight value of the left sampling unit, and W2 denotes a weight value of the right sampling unit.

16. The apparatus of claim 14, wherein the weight interpolation unit calculates the chrominance signal to be d−{(e×w1)+(f×w2)}/(W1+W2), d denotes the sum of pixels included in the sampling unit to be interpolated, e denotes the sum of pixels included in a sampling unit to the left of the sampling unit to be interpolated, f denotes the sum of pixels included in a sampling unit to the right of the sampling unit, W1 denotes a weight value of the left sampling unit, and W2 denotes a weight value of the right sampling unit.

17. The apparatus of claim 1, wherein the data unit corresponds to one pixel of a field in an interlaced scan method.

18. A color interpolation method of interpolating a luminance signal or a chrominance signal from a Cyan, Magenta, Yellow, Green (CMYG) color signal output from a photoelectric device, the color interpolation method comprising:
   determining an area between a flat area and an edge area, to which a sampling unit formed with two pixels of the photoelectric device, vertically adjacent to each other, and to be interpolated belongs;
   if the area is determined to be the flat area, performing linear interpolation of the sampling unit that is determined to belong to the flat area, and outputting the luminance signal or the chrominance signal; and
   if the area is determined to be the edge area, calculating a weight value of an adjacent sampling unit to be used for weight interpolation of the sampling unit that is determined to belong to the edge area, performing weight interpolation of the sampling unit determined to belong to the edge area, by using the weight value and outputting the luminance signal or the chrominance signal.

19. The method of claim 18, wherein the area to which the sampling unit to be interpolated belongs is determined by using a difference of a sampling unit immediately to the left of the sampling unit to be interpolated and a sampling unit immediately to the right of the sampling unit to be interpolated.

20. The method of claim 18, wherein in the linear interpolation, the luminance signal is obtained by adding a sum of pixels included in the sampling unit that is in the flat area and is to be interpolated, and a mean of sums of pixels included in sampling units adjacent to the sampling unit to be interpolated, and is output.

21. The method of claim 18, wherein in the linear interpolation, the chrominance signal is obtained by subtracting a mean of sums of pixels included in sampling units adjacent to the sampling unit to be interpolated, from a sum of pixels included in the sampling unit that is in the flat area and is to be interpolated, and is output.

22. The method of claim 18, wherein the weight value is provided by using spatial correlations of the sampling unit that is in the edge area and to be interpolated, with sampling units adjacent to the sampling unit.

23. The method of claim 22, wherein the weight value of the adjacent sampling unit is provided so that the weight value is inversely proportional to a difference between the sampling unit to be interpolated and each of the adjacent sampling units in a horizontal direction.

24. The method of claim 23, wherein k denotes the sum of pixels included in the sampling unit to be interpolated and m denotes the sum of pixels included in a sampling unit that is of a type identical to that of the sampling unit to be interpolated and is positioned on a same horizontal line on which the sampling unit to be interpolated is positioned, the weight value (W) is $$W = \frac{1}{|k-m|^n + 1}$$

and n denotes a predetermined degree.

25. The method of claim 22, wherein the weight value is provided by using a variance of sampling units included in a predetermined mask area.

26. The method of claim 25, wherein the weight value is inversely proportional to a value obtained by adding a first variance among sampling units in a first mask area centered at the adjacent sampling unit, and a second variance among sampling units in a second mask area.

27. The method of claim 26, wherein the first mask area includes sampling units that are of a type identical to that of the adjacent sampling unit and are positioned in vertical, horizontal, and diagonal directions centered at the adjacent sampling unit.

28. The method of claim 26, wherein the second mask area includes sampling units that are of a type identical to that of the sampling unit to be interpolated and are positioned centered at the adjacent sampling unit.

29. The method of claim 18, wherein in the weight interpolation, the luminance signal or the chrominance signal are interpolated through a weight calculation using the sampling unit to be interpolated, the weight value determined in the weight value calculation unit, and the adjacent sampling unit, and are output.

30. The method of claim 29, wherein in the weight interpolation, the luminance signal is calculated as $d+\{(e\times w1)+(f\times w2)\}/(W1+W2)$, where d denotes the sum of pixels included in the sampling unit to be interpolated, e denotes the sum of pixels included in a sampling unit to the left of the sampling unit to be interpolated, f denotes the sum of pixels included in a sampling unit to the right of the sampling unit, W1 denotes a weight value of the left sampling unit, W2 denotes the weight value of the right sampling unit.

31. The method of claim 29, wherein in the weight interpolation, the chrominance signal is calculated as $d-\{(e\times w1)+(f\times w2)\}/(W1+W2)$, where d denotes the sum of pixels included in the sampling unit to be interpolated, e denotes the sum of pixels included in a sampling unit to the left of the sampling unit to be interpolated, f denotes the sum of pixels included in a sampling unit to the right of the sampling unit, W1 denotes a weight value of the left sampling unit, and W2 denotes a weight value of the right sampling unit.

* * * * *